M. L. ADAMS.
TRACTOR ATTACHMENT FOR AUTOMOBILES.
APPLICATION FILED MAR. 10, 1916. RENEWED FEB. 19, 1918.
1,293,657.
Patented Feb. 11, 1919.
2 SHEETS—SHEET 1.
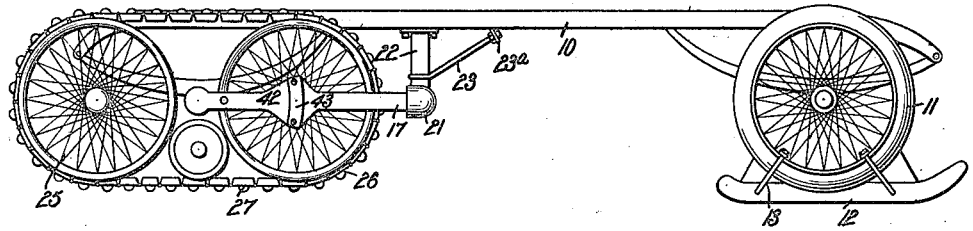
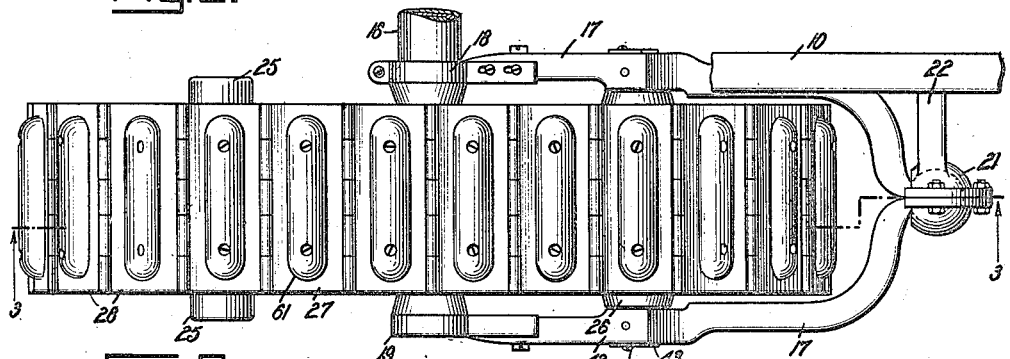
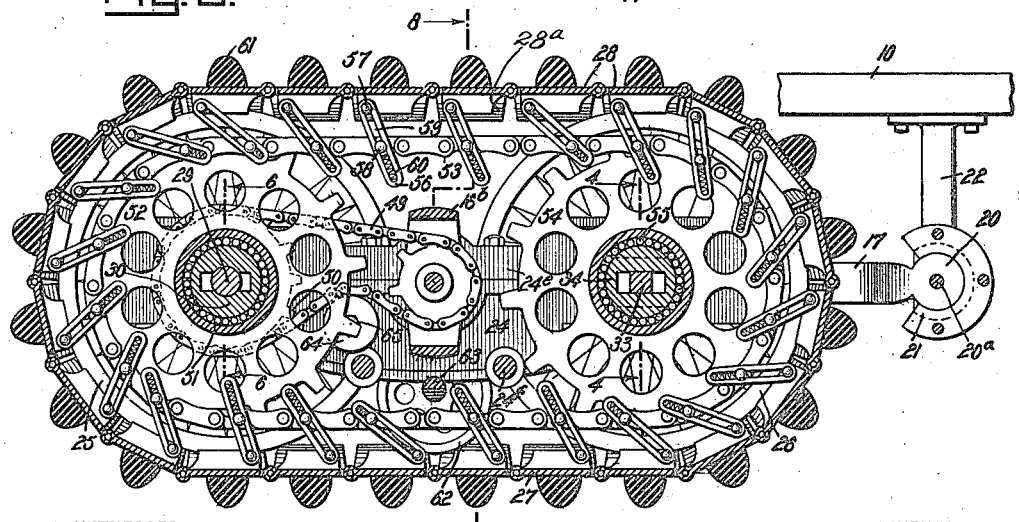
WITNESSES
INVENTOR
Morton L. Adams
BY
ATTORNEYS

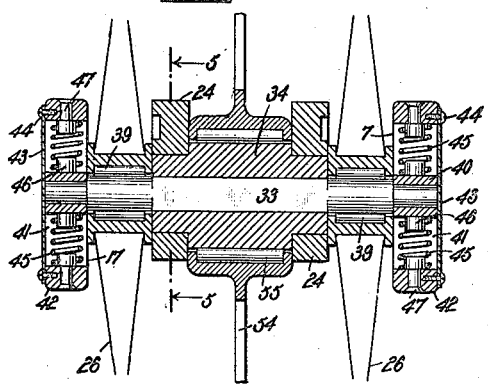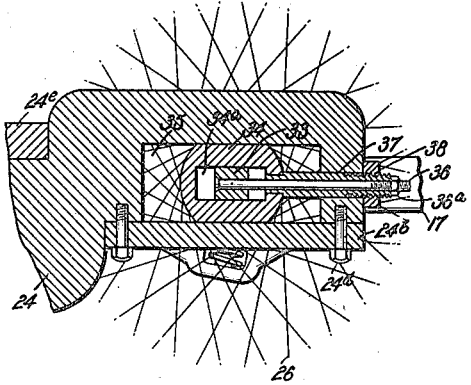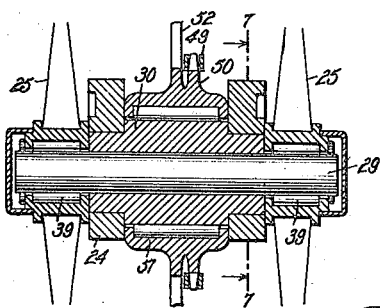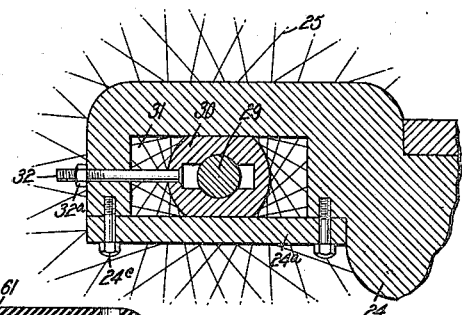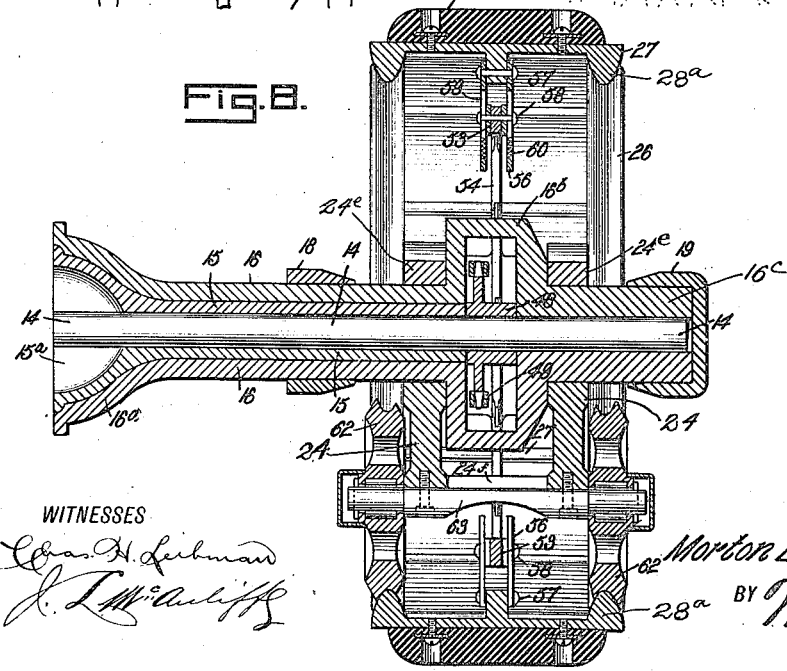

UNITED STATES PATENT OFFICE.

MORTON LEA ADAMS, OF SEATTLE, WASHINGTON, ASSIGNOR TO ADAMS TRACTOR COMPANY, OF SEATTLE, WASHINGTON, A CORPORATION OF WASHINGTON.

TRACTOR ATTACHMENT FOR AUTOMOBILES.

1,293,657. Specification of Letters Patent. Patented Feb. 11, 1919.

Application filed March 10, 1916, Serial No. 83,312. Renewed February 19, 1918. Serial No. 218,174.

*To all whom it may concern:*

Be it known that I, MORTON L. ADAMS, a citizen of the United States, and a resident of Seattle, in the county of King and State of Washington, have invented a new and Improved Tractor Attachment for Automobiles, of which the following is a full, clear, and exact description.

A prime object of my invention is to provide a practical attachment for application to an automobile in place of the rear wheels whereby to drive the automobile over snow and ice with the front wheels supported on shoes or sleds or to propel the automobile on muddy, sandy, or similar roads. This purpose of my invention is attained by a tractor involving a housing applicable to the usual axle housing and gear case of the automobile, and a frame mounted on said first-mentioned housing and equipped with a tractor preferably of the caterpillar type and therefore comprising a belt and actuating means therefor driven from the axle of the automobile, the said housing of the tractor attachment having means preferably in the form of a torsion yoke or frame adapted to be connected with the chassis.

Further objects and advantages of the invention will appear as the description proceeds.

Reference is to be had to the accompanying drawings forming a part of this specification in which similar reference characters indicate corresponding parts in all the views.

Figure 1 is a diagrammatic view in side elevation of an automobile chassis having my invention applied thereto;

Fig. 2 is a plan view on an enlarged scale of one side of the tractor attachment, the attachment being the same on both sides of the automobile;

Fig. 3 is a longitudinal vertical section on the lines 3—3, Fig. 2;

Fig. 4 is a transverse vertical section on the line 4—4, Fig. 3;

Fig. 5 is a section on the line 5—5, Fig. 4;
Fig. 6 is a transverse vertical section on the line 6—6, Fig. 3;
Fig. 7 is a section on the line 7—7, Fig. 6;

Fig. 8 is a transverse vertical section on the line 8—8, Fig. 3.

My invention is applicable to an automobile of any of the standard makes of which the numeral 10 indicates the chassis. The tractor attachment replaces the rear wheels but the front wheels, one of which is indicated at 11, are retained and a shoe 12 may be applied to each front wheel and suitably secured thereto as by clamps 13.

The numeral 14 indicates the rear or drive-axle of an automobile, and the numeral 15 indicates the usual axle housing, the housing being here shown as one of known type and generally of the type employed on the Packard automobile. My tractor attachment includes a housing 16, which, preferably, is formed of upper and lower members conforming to the axle casing 15 of the particular car and conforming, as at 16$^a$, with the gear casing 15$^a$ of the housing 15. The housing 16 also includes an extension support 16$^c$ beyond the yoke 16$^b$. The purpose of the housing 16 is primarily to provide a means whereby the tractor attachment can be readily attached to the axle casing, and furthermore serves to strengthen the axle 14 so that the additional weight can be carried.

A yoke or torsion frame 17, hereinafter referred to as a yoke, which, it will be understood may be of any approved form, is secured at its rear end to the housing 16 and presents spaced side bars as best seen in Fig. 2, one of said bars in the present example being secured to the housing 16 by a clamp 18 and the other, or outer bar being secured to said housing 16 by a cap 19 which is suitably fastened to the adjacent arm of said yoke 17. At the forward ends the side bars of the yoke 17 are brought together and provided with a rockable ball head 20, the side members of which are formed on the respective side members of the yoke 17 and united as by a pin or screw 20$^a$. The ball head 20 is retained rockably in a socket 21, here shown as formed on a bracket 22 adapted to be bolted or otherwise fastened to the adjacent side member of the chassis 10. A brace 23 may be employed in connection with the bracket 22 and provided with nuts for securing it to any fixed member 23$^a$.

A frame 24 is hung at its center on the housing 16 so as to extend in the front and rear of the said housing and the rear axle 14, said frame being adapted to have a limited vertical rocking movement. Supported in the frame 24 at the ends thereof, are idler wheels, 25, 26, over which travels the tractor belt or apron, designated generally by the numeral 27, and composed of hinged links 28. It is to be observed that the links 28 are hinged closely together as clearly shown in Fig. 2 and that the hinges extend throughout the width of the belt. The knuckle joints of the hinges are tight fitting and thus the entrance of dirt through the belt is effectually prevented. Each link has rail portions 28ª which form tracks on the inside of the attachment. These tracks run in the grooved idler wheels. The tractor belt is thus prevented from running off. There is a pair of wheels 25 at the rear end of the frame 24 and a pair of wheels 26 at the forward end. The hubs of the wheels 25 turn loosely on a shaft or axle 29 which is mounted in a block 30, said block being adjustable in openings 31 in the frame 24 by adjusting bolts 32 and nuts 32ª. Similarly, the front wheels 26 turn loosely on an axle or shaft 33 adjustable in a slot 34ª of a block 34, which itself is adjustable in an opening 35 in the frame 24. The adjusting means may consist of bolts or screws 36 extending from the axle 33 through a bushing 37 connected with the block 34 and extending through the end of the frame 24, there being nuts 36ª on the bolts 36 and nuts 38 on the bushing. The frame 24 at the bottom of the openings 31, 35, is provided with plates 24ª, 24ᵇ, respectively secured by screws, 24ᶜ, 24ᵈ.

To cushion the frame 24 in its limited vertical rocking movements, the axle 33 is received at its ends in blocks or sleeves 40 adapted to move in curved slots 41, which are formed in the yoke 17, said yoke being enlarged at these points for the purpose as at 42. The slots 41 are closed at the outside by cap plates 43 secured by screws 44, or the like. The blocks 40 are cushioned by coil springs 45 in the slots 41 above and below said blocks, the said springs being received at their ends on studs, 46, 47, on the yoke 17 and axle blocks 40, respectively.

To actuate the tractor belt 27, a sprocket pinion 48 is provided, fast on the shaft 14 within a casing 16ᵇ forming part of the housing 16. A chain belt 49 runs over the said sprocket wheel and over a sprocket wheel 50 which turns on the block 30 as a bearing, roller bearings or ball bearings 51 being provided in practice. In fixed relation to the sprocket wheel 50 is a sprocket wheel 52, and a chain belt 53 runs over the said wheel 52 and over a similar sprocket wheel 54, which turns on the block 34 as a bearing, there being roller bearings 55, or the like, in practice.

The connection between the actuating chain 53 of the tractor belt 27 and the latter belt, is established by links 56, each link being pivoted as at 57 to a link 28 of the belt 27. A slot and pin connection is established between the links 56 and the drive-belt 53, there being slots 59 in the links and pins 58 on the chain 53. Between the pivots 58 and the adjacent end of each link 56, said links are provided in the slots 59 thereof, with compression springs 60 so that a cushion connection is thereby established between the chain 53 and the said links.

The elements, 18, 19, on the side bars of the torsion yoke or frame 17 are sufficiently loose on the housing 16 to permit of slight rocking movement independently of the frame 24 as necessary for the yoke to conform to the relative movements of the axle and chassis. The described rockable mounting of the frame 24 adapts it to conform to road conditions.

The tractor unit, it will thus be observed, is hung on the drive-axle of the automobile over its housing. It provides an effective propelling unit for sledding or driving the machine over sandy roads or the like, and one readily applicable to any automobile of standard make. Its direct association with the drive-axle and its flexible character make the tractor unit sensitively responsive to the motor drive and the controlling means of the automobile, and at the same time it readily adapts itself to road conditions, without check or interference with the said motor-drive and control.

It is to be observed from Fig. 8 that the housing 16 extends beyond the axle housing 15 so that the projecting end of the housing 16 directly fits that portion of the axle 14 projecting beyond the housing 15, and the drive sprocket 48 is disposed on the axle 14 directly adjacent to the end of the housing 15 between the same and the opposed wall presented by the housing 16ᵇ. The arrangement provides for slinging a tractor unit having a tractor belt of effective width and accommodates the actuating means for said belt without inordinately increasing the total width of the automobile with the tractor elements.

The adjustment of the bolts 32 serves to move the wheels 25, thereby adjusting the tension of the belt 27. The adjustment of the bolts 36 may be utilized to adjust the shaft or axle 33 and thereby move the sprocket wheel 54 for tensioning the drive chain 53 without affecting the belt wheels 26 or belt 27. On the other hand, the bushing 37 and nuts 38 serve to adjust the wheels 26 or the sprocket wheels 54 and 26 may be adjusted together.

The frame 24, at the center, is provided with bearings having caps 24ᵉ to hang the said frame on the housing 16 at each side of the casing 16ᵇ. The opposite side members of said frame 24 are connected by transverse bolts or screws 24ᶠ.

The numeral 61 indicates suitable tread members, preferably resilient, secured to the respective links 28 of the belt 27. The numeral 62 indicates a backing wheel or idler above the lower run of the belt 27, said wheel being mounted on an axle 63. The numeral 64 indicates a roller over which the chain 49 passes at the under side, said roller being mounted on a stud shaft 65 on the adjacent side of the frame 24.

The described construction affords a practical means for carrying my invention into effect and I would state in conclusion that I do not limit myself strictly to the mechanical details herein illustrated since manifestly the same can be considerably varied without departure from the spirit of the invention as defined in the appended claims.

Having thus described my invention I claim as new and desire to secure by Letters Patent:

1. A tractor attachment for automobiles, comprising a transverse housing, a torsion yoke mounted at its rear end on the said transverse housing to turn thereon, means including a ball and socket to connect the front end of said torsion yoke with the chassis of the automobile, a frame rockably hung at its approximate center on the said transverse housing, transverse shafts on the said frame at the ends thereof, idler wheels loose on said shafts, a tractor link belt running over said idler wheels, sprocket wheels loose on said shafts, a chain belt running over said sprocket wheels, links connecting the chain belt with the links of the tractor belt, a driven sprocket wheel in fixed relation to one of the first mentioned sprocket wheels, a drive sprocket accommodated in the transverse housing and adapted to be received and be fixed on the automobile drive axle adjacent to an end of the axle housing, and a drive chain running over the said drive sprocket and driven sprocket.

2. A tractor attachment for automobiles, comprising a transverse housing, a torsion yoke presenting side bars mounted at their rear ends on the said transverse housing, means to pivotally connect the front ends of said bars with the chassis of an automobile, a frame rockably hung at its approximate center on said first-mentioned housing between said torsion bars, wheels on said second frame at the end, a tractor belt running over said wheels, and actuating means for said belt, said actuating means including a drive element in the transverse housing adapted to receive and be made fast on the drive axle of the automobile and drive connections between said drive element and said tractor belt.

3. In a tractor attachment for automobiles, a longitudinally disposed frame presenting side members, wheels on said frame near its ends, a tractor belt on said wheels, means to sling said frame at its approximate center on the drive axle of an automobile, said means including a housing with a yoke, arranged to embrace the axle casing, an extension support integral with the yoke and in position to receive and support the drive axle beyond the axle casing, a drive element fixed on the drive axle in said yoke, and means for actuating said tractor belt from said drive element.

4. The combination with the chassis, drive axle, and axle housing of an automobile, of a transverse housing fitting and secured on the said axle housing and extending laterally beyond the axle housing, and directly fitting the drive-axle beyond the axle housing, a longitudinal frame having side members, one of said side members embracing the second mentioned housing adjacent to the end of the axle housing and the other side member embracing the second mentioned housing at the projecting portion thereof, wheels on said frame in the front and rear of the drive axle of the automobile, a tractor belt on said wheels, a drive element on the axle adjacent to the end of the axle housing and within the projecting end of the second mentioned housing, and means to actuate said tractor belt from said drive element.

5. In a tractor attachment for automobiles, a housing ranging transversely of the attachment and arranged to fit on the exterior of the axle casing of an automobile and of a length to extend beyond the said axle casing, a longitudinal frame ranging across the housing and having side members embracing at their approximate centers the said housing, one of said members embracing the housing over the axle casing and the other side member embracing the housing beyond the axle casing, side bars mounted at their rear ends on said housing outside of the said longitudinal frame, means to connect the forward ends of said side bars with the chassis of an automobile, tractor devices including wheels on the longitudinal frame and a tractor belt on said wheels, and means to actuate said tractor devices from the axle of the automobile.

6. A tractor attachment for automobiles comprising a frame; tractor devices including wheels on said frame and a tractor belt on said wheels; means to sling said frame on the drive axle of an automobile over the drive axle casing, and means to actuate said tractor devices from the said drive axle of the automobile, said actuating means including a drive element in said frame in position to receive and fit over the drive axle beyond the outer end of the axle casing.

7. In a tractor attachment for automobiles, a transversely disposed housing, a frame rockably hung at its approximate center on the said transverse housing, a torsion yoke mounted at its rear end on the said transverse housing outside of the said frame, means to connect the front end of said torsion yoke with the chassis of the automobile, tractor devices on said frame, and means to actuate said tractor devices from the drive axle of the automobile.

8. In a tractor attachment for automobiles, a longitudinally disposed frame, means to sling said frame at its approximate center on the axle of an automobile, idler wheels mounted to turn on said frame near the ends, a tractor belt running over said idler wheels, sprocket wheels in said frame adjacent to the loose wheels, a chain belt running over the said sprocket wheels, said belt being separate from the sprocket belt, connections between the chain belt and the sprocket belt, and means to drive one of said sprocket wheels from the drive axle of the automobile.

9. In a tractor attachment for automobiles, a longitudinally disposed frame, means to sling said frame at its approximate center on the axle of an automobile, idler wheels mounted to turn on said frame near the ends, a tractor belt running over said idler wheels, sprocket wheels in said frame adjacent to the loose wheels, a chain belt running over the said sprocket wheels, said belt being separate from the tractor belt, and links connecting the said chain belt with the said tractor belt, the connections between the links and one of said belts being slot and pin connections.

10. In a tractor attachment for automobiles, a longitudinally disposed frame, means to sling said frame at its approximate center on the axle of an automobile, idler wheels mounted to turn on said frame near the ends, a tractor belt running over said idler wheels, sprocket wheels in said frame adjacent to the loose wheels, a chain belt running over the said sprocket wheels, said belt being separate from the tractor belt, slotted links pivotally connected at one end with the tractor belt, pins on the chain belt engaging in the slots of the said links, and cushion springs in the said links for the last-mentioned pins.

11. In a tractor attachment for automobiles, a longitudinal frame, means to sling said frame at its approximate center on the drive axle of an automobile, transverse shafts on said frame near its ends, blocks adjustable longitudinally of said frame in which said shafts are mounted, one of the shafts being adjustable relatively to the block in which it is mounted, and adjusting means engaging respectively, the last-mentioned block and the last-mentioned shaft.

12. In a tractor attachment for automobiles, a frame, means to rockably mount said frame at its approximate center on the drive axle of an automobile, tractor devices mounted on said frame and including a tractor belt, means to actuate said tractor devices from the drive axle of the automobile, side bars, means to rockably mount the said side bars on the drive axle at the sides of the said frame, means to connect the forward ends of said side bars with the chassis of the automobile, cushioning means on said side bars, and members rockable with the said frame and engaging said cushioning means.

13. In a tractor attachment for automobiles, a frame, means to rockably mount said frame at its approximate center on the drive axle of an automobile, transverse shafts on said frame, tractor devices and driving means therefor, said tractor devices including wheels on said shafts and a belt running over said wheels; longitudinal bars at the sides of said frame, means to mount said bars at their rear ends on the drive axle of the automobile, means to connect the front ends of said bars with the chassis of the automobile, said bars having curved slots into which the said shafts extend, and springs in said slots above and below said shafts and engaged by the latter.

14. A tractor attachment comprising a housing arranged to be fitted on the original axle casing of an automobile to strengthen the automobile axle for the support of said attachment, said housing including an extension support beyond the end of the axle casing, receiving the end of the automobile axle and acting as a support for a portion of said attachment.

15. In a tractor attachment, the combination with an axle casing and an axle extending beyond the casing, of a housing arranged to be fitted on the casing to strengthen the axle, said housing comprising a yoke arranged to accommodate a driving element of the tractor attachment, and an extension of the housing beyond the yoke, providing a bearing for the end of said axle, said housing acting as a support for portions of the attachment, at the sides of said yoke.

16. The combination in a tractor attachment, consisting of an endless driving chain, a circumposed tractor belt having tracks, slotted links with pin connections to both belts, and grooved idler wheels running on the tracks to prevent lateral displacement of the tractor belt and consequent undue wear on the link and pin connections.

17. A tractor attachment comprising a driven endless chain belt, an endless tractor belt spaced from and circumposed on the chain belt, and means flexibly connecting said belts together for driving the tractor belt from the chain belt.

18. A tractor attachment comprising a driven endless chain belt, an endless tractor belt in spaced circumposition on the chain belt and consisting of a plurality of links hinged together, rail portions on the tractor belt forming tracks on the inside of the attachment, means flexibly connecting each link with the chain belt enabling the pulling of the tractor belt at both ends, said means comprising slotted links with pin connections to both belts and resilient means incorporated in the link slots, and grooved idler wheels supporting the tractor belt at both ends, the tracks running in said grooves and preventing lateral displacement of the tractor belt and binding in said belt connecting means.

19. A tractor attachment comprising a pair of axles, a sprocket on each of the axles, a chain belt running over the sprockets, means for applying power to move the chain belt, a tractor belt actuated by and traveling in a plane outside of the chain belt, tracks on the tractor belt on the inside, idler wheels on each of the axles at the sides of the sprockets providing equal lateral supports for the sides of the tractor belt at both ends of the attachment and having grooved peripheries to receive the tracks and prevent the tractor belt from running off, and plural flexible driving means joining the tractor and chain belts, said means enabling the exertion of a pull on the tractor belt from the chain belt at both ends.

20. In a tractor attachment, the combination of a tractor belt having tracks, a chain belt, members having pin and slot connections with both belts for driving the former from the latter, sprockets engaging the chain belt at both ends of the attachment, grooved idler wheels receiving the tracks in the grooves to prevent lateral displacement of the tractor belt relative to the chain belt, and to support the tractor belt independently of said sprockets, and grooved sheaves applied to the tracks of the lower strand between said idler wheels to receive lateral thrusts and keep the lower strand straight.

In testimony wherof I have signed my name to this specification in the presence of two subscribing witnesses.

MORTON LEA ADAMS.

Witnesses:
GILBERT NAIRN,
HENRY C. GOODWIN.